O. E. OLESBERG.
STUMP AND ROOT EXTRACTOR.
APPLICATION FILED AUG. 17, 1916.
1,235,838.
Patented Aug. 7, 1917.
3 SHEETS—SHEET 2.
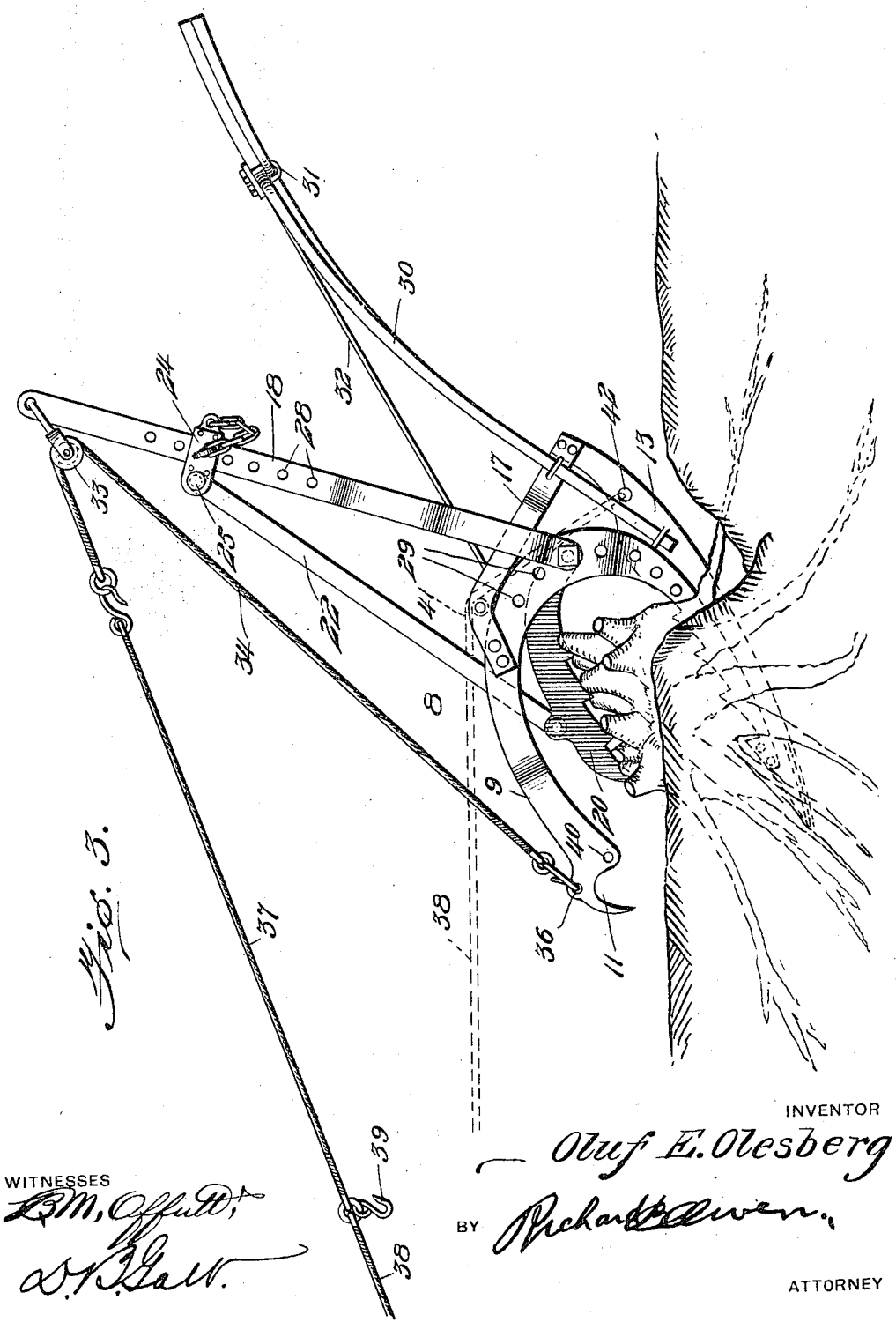
WITNESSES
INVENTOR
Oluf E. Olesberg
BY
ATTORNEY O. E. OLESBERG.
STUMP AND ROOT EXTRACTOR.
APPLICATION FILED AUG. 17, 1916.
1,235,838.
Patented Aug. 7, 1917.
3 SHEETS—SHEET 3.
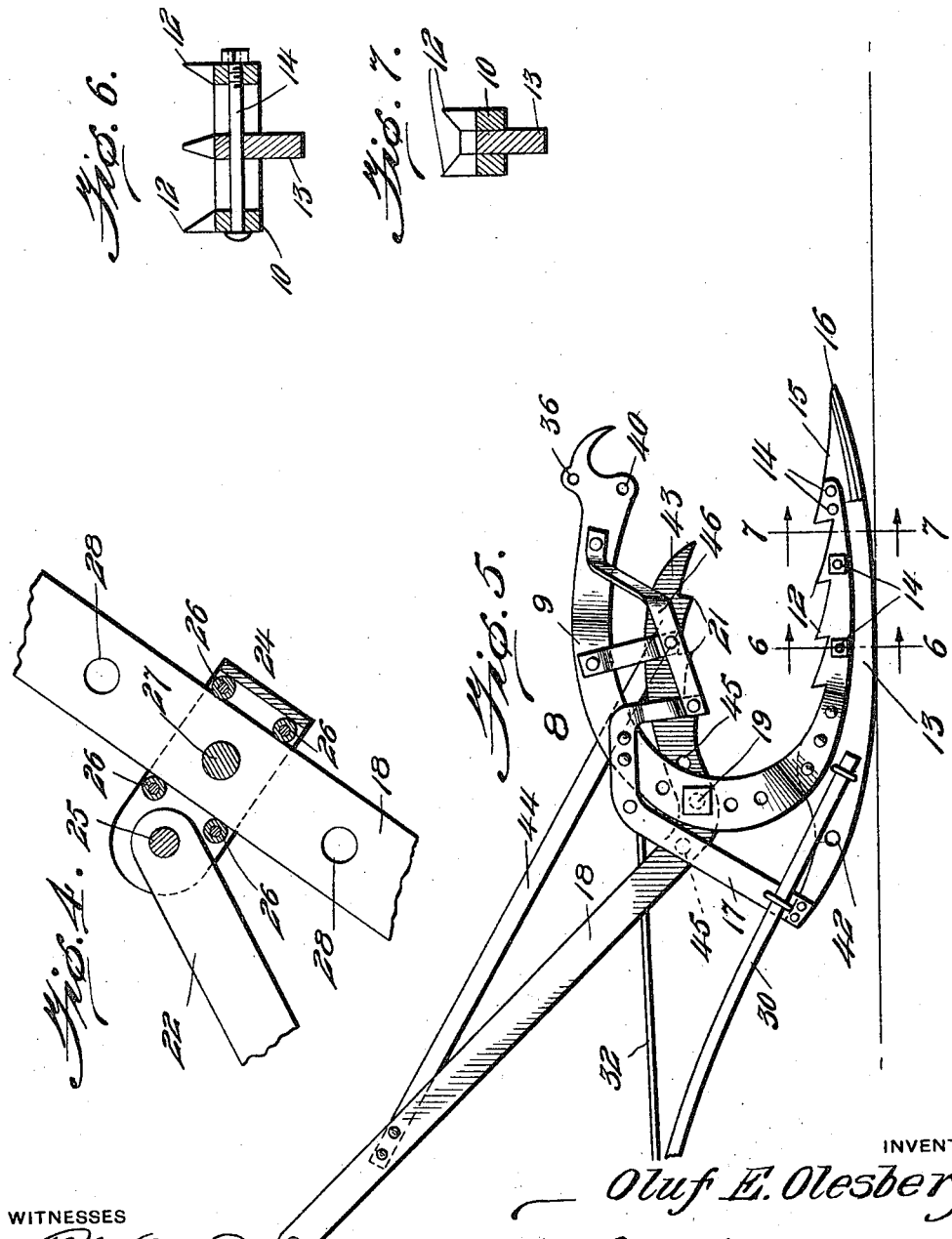
WITNESSES
INVENTOR
Oluf E. Olesberg
BY
ATTORNEY

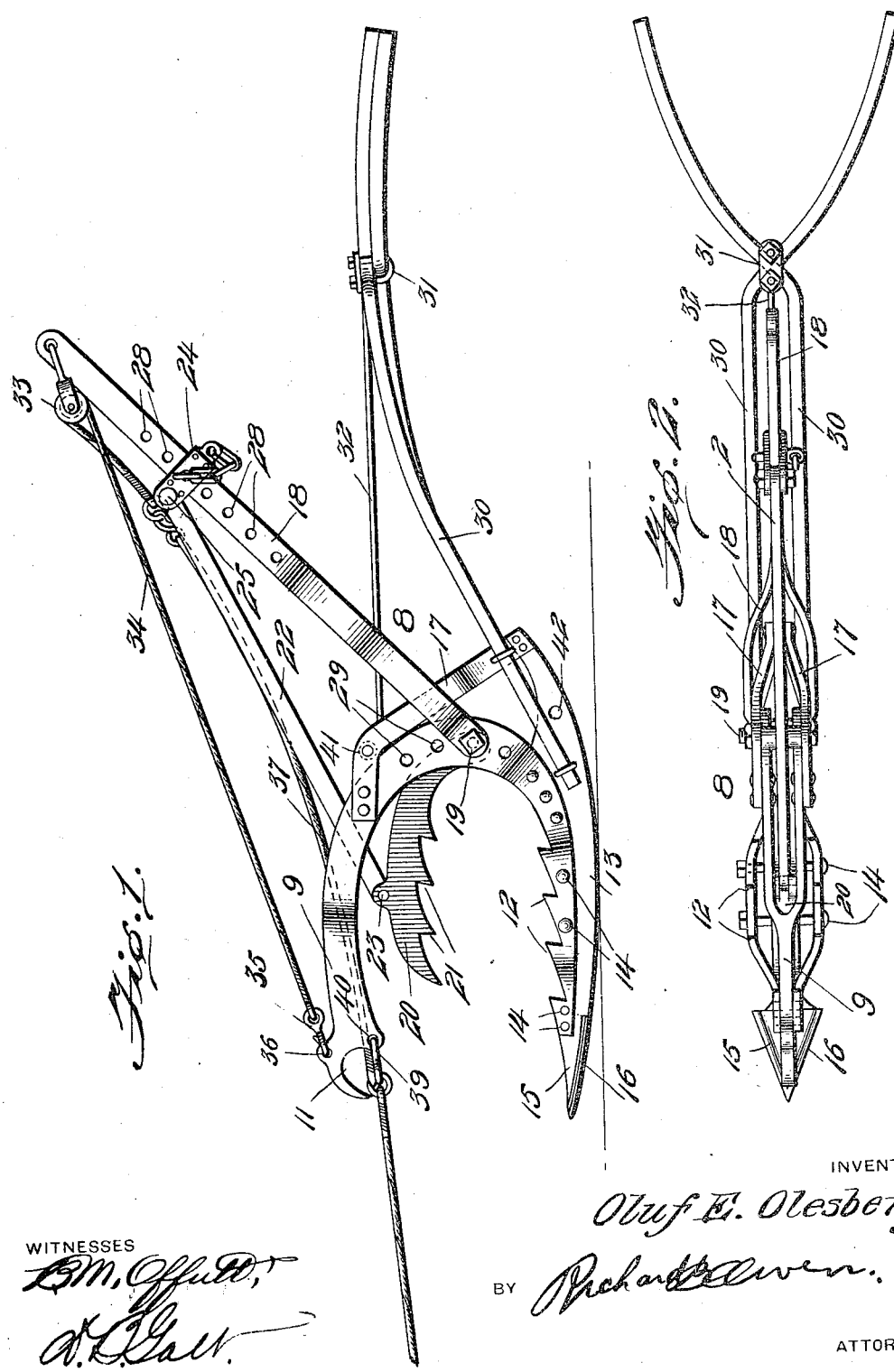

UNITED STATES PATENT OFFICE.

OLUF E. OLESBERG, OF BAWLF, ALBERTA, CANADA.

STUMP AND ROOT EXTRACTOR.

1,235,838.          Specification of Letters Patent.          Patented Aug. 7, 1917.

Application filed August 17, 1916. Serial No. 115,556.

*To all whom it may concern:*

Be it known that I, OLUF E. OLESBERG, a subject of the King of Great Britain, residing at Bawlf, in the Province of Alberta, and Dominion of Canada, have invented certain new and useful Improvements in Stump and Root Extractors, of which the following is a specification.

This invention relates to stump and root extracting devices, and has for its primary object to provide improvements in mechanisms of this character whereby stump and root extracting operations are greatly simplified and improved.

A further object of the invention is to provide a device of this character which is capable of being operated in substantially the same manner as a land plow, and whereby a firm and secure grip is had upon the stump or roots at all times during the lifting and twisting operations.

A still further object of the invention is to provide a stump extractor which is constructed in such manner that the pulling power delivered to the device is utilized to force the stump gripping jaw into firm engagement with the stump or roots.

A still further and particular object of the invention is to provide a device of this character which is of simple and inexpensive construction, which is composed of but few readily assembled parts all so constructed and arranged as to prevent wear, breakage or derangement of the same, which is of light weight and simple or easy operation, which is capable of being readily adjusted to adapt itself to stumps or roots of various sizes and shapes, and which will prove thoroughly efficient in the attainment of the ends for which it is designed.

With these objects in view, together with others which will appear as the description proceeds, the invention resides in the novel formation, combination and arrangement of parts, all as will be described more fully hereinafter, illustrated in the drawings, and particularly pointed out in the claims.

The invention will be best understood with reference to the accompanying drawings, wherein:—

Figure 1 is a side elevation of a stump extracting device constructed in accordance with the invention, Fig. 2 is a top plan view of the extractor, Fig. 3 is a view similar to Fig. 1 and illustrating the device in operation, Fig. 4 is an enlarged fragmentary sectional view of a portion of the jaw operating lever, Fig. 5 is a right hand side elevation of a stump extractor and showing a slightly modified form of the device, Fig. 6 is an enlarged detailed sectional view taken upon line 6—6 of Fig. 5, and Fig. 7 is a similar view taken upon line 7—7 of Fig. 5.

In carrying out the invention I provide a plow like device of light construction and capable of being easily drawn by horses or other draft animals, the shoe of the device being adapted to be forced beneath stumps, roots and the like. Associated with the device is a movable jaw which derives its clamping power from the forward pull of the draft animals, and which firmly and securely engages with the upper part or surface of the object operated upon, and firmly maintains this grip throughout the entire operation of the extractor. This jaw is capable of being adjusted upon the beam of the extractor, to compensate for roots or stumps of various sizes and shapes, and to accelerate the clamping power of the jaw. The device is steered in substantially the same manner as the ordinary plow, and various twists or turns may thus be delivered to the extractor to facilitate quick and perfect operation of the same.

Referring now more particularly to the drawings, 8 indicates the body portion of the extractor, which comprises an upper beam portion 9 to which draft animals may be attached, and which is bent downwardly and forwardly at its rear end as shown to provide a hook portion 10. The forward end of the beam 9 projects beyond the forward end of the hook portion, and is shaped to provide a crotch or bearing portion 11, the same being adapted during the operations of the device to rest either upon the ground or a log to assist in a perfect operation of the extractor. The beam 9 is bifurcated from a point adjacent its forward end throughout the rear and downward extent of the same, the furcations being spaced a slight distance apart at the beam and rear portions thereof, and being widened at the lowermost portion, as shown in Fig. 2. The upper edges of the lower portions of the furcations are provided with teeth 12, the forward edges of which are beveled as shown. Associated with the hook portion 10 of the extractor is a shoe 13. This shoe curves upwardly at its forward and rear ends as shown, and provides a runner or ground engaging surface for the device when the same is in operation. This shoe is connected between the furcations forming the hook portion by bolts or screws 14. The upper surface of the shoe thus forms a central rib for the hook portion, and may also be provided with teeth for engagement with roots or stumps. The forward extremity of the shoe is widened, forming a toe 15, to the under face of which is detachably secured a V-shaped cutting blade 16. The rear end of the shoe extends beyond the rearmost extremity of the beam 9, and is connected to the said beam by brace bars 17.

Pivotally connected to the rearmost portion of the bifurcated beam 9 is a lever 18, the latter being also bifurcated at one end to straddle the furcations of the beam, and to be hingedly connected thereto by a pin or bolt 19. Pivotally mounted upon the bolt 19 also and between the furcations of the beam 9 is a jaw 20, the latter being provided in its under face or edge with teeth 21 adapted to coöperate with the teeth of the hook portion in firmly biting into roots or stumps. The jaw 20 extends forwardly beneath the beam 9, and is of a length substantially equal to the stump engaging portion of the hook 10, and by reason of its pivotal connection with the beam is capable of moving toward and away from the said hook portion. A link 22 is pivoted at one end as at 23 to the forward portion of the jaw 20, and extends rearwardly between the beam furcations and into close proximity at its opposite end with the rear portion of the lever 18.

A sliding member or clevis 24 is arranged upon the straight rear end of the lever 18, and is pivoted as at 25 with the rearmost extremity of the link 22. This clevis may be formed of a pair of spaced plates, having rollers 26 disposed in spaced relation between the said plates for engaging the opposite edges of the lever 18. This construction permits of free sliding movement of the clevis upon the lever, and the said clevis may be locked in its various positions of adjustment upon the lever by the insertion of a locking pin 27 through suitable apertures arranged in the plates and alined with any one of a series of openings 28 provided in the said lever.

The pivot pin 19 for the jaw 20 and for the lower end of the lever 18 may be adjusted within any one of a number of spaced apertures 29 in the beam 9, the arrangement providing means whereby the swing or throw of the jaw may be readily varied. This arrangement permits of the jaw being adjusted so as to be adaptable to stumps or roots of various sizes and formations. It is obvious also that the fulcrum of the lever 18 is likewise readily changed, so that the leverage required for the extraction of variously formed stumps and roots may be accordingly varied. The arrangement of the sliding clevis upon the lever enables the throw of the jaw to be changed.

The handles for guiding and manipulating the extractor are illustrated at 30, and comprise bars or rods secured at their forward ends one upon each side of the rearwardly projecting portion of the shoe 13, and extending rearwardly therefrom and are crossed adjacent their rear extremities to form handles for convenient grasp by an operator. The handles are shackled together at their crossing point, as at 31, and brace rods 32 may connect the said handles with the beam of the device to reinforce the said handles.

The lever 18 is relatively long, and has at its outer end a pulley or block 33, around which a cable 34 passes. This cable is secured at one end as by means of a hook 35 in an opening 36 formed within the upper portion of the forward end of the beam 9, and is connected at its opposite end by a length of cable 37 with the draft apparatus 38 for the extractor. This draft apparatus carries at its rear end a hook 39 for engagement within an opening 40 in the lower portion of the forward end of the beam 9. The distance between the rear end of the lever 18 when swung to its rearmost position and the opening 40 in the extractor beam is slightly less than the doubled length of the cables 34 and 37, whereby when the draft apparatus is connected to the beam 9 through the opening 40, the cables 34 and 37 will be slack, and no pressure will be delivered to the lever 18. When the hook 39, however, is detached from the opening 40, the cables 37—34 will be drawn and the power of the draft animals will be directly connected with the outer extremity of the lever 18. As the lever swings upon its pivot, the jaw 20 will be forced downwardly and into engagement with stumps or roots within the hook 10 of the extractor. After the lever 18 has moved forwardly until prevented by further movement by the roots or stumps beneath the jaw, further forward movement of the draft animals will cause the extractor to tilt forwardly and to wrench stumps or roots held thereby loose from the ground. In encountering roots or stumps of prolific growth, and where the surrounding earth is soft, a log may be placed beneath the forward end of the beam 9, and the crotch or bearing portion 11 thereof will form a fulcrum upon which the extractor may turn to lift the stump or roots clear of the ground. After one operation, the lever 18 may be swung rearwardly to release the extracted matter, and the device may be readily adjusted for further work.

In extracting roots or stumps of comparatively small size, the use of the powerful lever may not be required, and in such instances the draft apparatus may be extended over a pulley 41 supported between the brace bars 17 at the rear end of the beam 9, and connected in an opening 42 at the rear extremity of the shoe 13. In operating the device thus arranged, the shoe and hook portion of the extractor is inserted beneath the root or stump, and after the draft apparatus has been connected in the above described manner, forward pull by the draft animals will cause the extractor to rock forwardly and to wrench the stump or root free of the ground.

In Fig. 5 of the drawings I have shown an extractor of slightly modified construction, and wherein the gripping jaw and rock lever are formed of a single piece of material. The lever 18 in this instance is straight for the major portion of its length, and is bent forwardly at its lower end to provide a gripping jaw 43. This jaw is provided with a series of teeth as in the preferred embodiment of the invention. A reinforcing strut 44 connects the lever with the jaw, whereby breakage of the latter in the extracting operation is prevented. The jaw may be adjusted forwardly or rearwardly of the beam by inserting the pivot bolt 19 in any one of a series of openings 45 formed in the lever as shown. By this construction it is seen that adjustment of the jaw and lever may be readily made without the sliding clevis arrangement 24 illustrated in the preferred form of the invention. The operation of the device is essentally the same as has been heretofore set forth.

In Fig. 5 of the drawings there is also illustrated a runner member 46 upon one side of the beam 9. This runner comprises an angularly bent bar, firmly secured to the beam and projecting a relatively short distance beyond the side of the latter. In operating the extractor having the runner 46, the operator twists the device laterally, wrenching the roots or stumps held thereby, and the runner 46 when resting upon the ground forms a fulcrum for further rocking the extractor to tear the roots free from the ground.

From the above description taken in connection with the drawings it is obvious that I have provided an extremely simple and yet thoroughly efficient mechanism for performing the desired functions. The sharp and relatively narrow point of the shoe permits of the device being readily engaged beneath roots, stumps and the like, and the widened hook portion forms ample surface for firm engagement with the under portions of the growths. The particular lever and jaw construction permits of a relatively low degree of power being developed into powerful gripping pressure to firmly hold the stumps or roots in the extracting operation.

While the above is a description of the preferred embodiment of the invention, it is obvious that various changes in the minor details of construction and arrangement of parts may be resorted to if desired without departing from the spirit of the invention or exceeding the scope of the claims.

What is claimed is:—

1. In a device of the class described, a plowing element, a jaw pivoted upon and capable of moving toward and away from said element, a lever for moving said jaw, a link connecting said lever and jaw and means for adjusting said link longitudinally of said lever, substantially as described.

2. In a device of the class described, a plowing element, having a hook portion, a shoe secured to said hook portion and forming a runner for the same, a jaw pivoted upon said plowing element, means for moving said jaw toward and away from said hook portion, and handles projecting rearwardly from said plowing element, substantially as described.

3. In a device of the class described, a plowing element comprising a beam bent adjacent its rear end to provide a forwardly projecting hook, the forward ends of said beam and hook being disposed in the same vertical plane, the forward end of said beam portion forming a bearing portion, and means for attaching a draft apparatus in arrears of said hook and below said bearing portion substantially as described.

4. In a device of the class described, a beam bent adjacent its rear end to provide a downwardly and forwardly projecting hook portion, a jaw pivoted upon said bent portion and adapted to move toward and away from said hook portion, the upper forward end of said beam providing a bearing portion, and a lever on said beam for moving said jaw, substantially as described.

5. In a device of the class described, a beam bent adjacent its rear end to provide a downwardly and forwardly projecting hook portion, teeth on said hook portion, a roller upon the upper part of said beam, the forward end of the upper portion of said beam providing a crotch, and means for attaching a draft apparatus to the rear portion of said hook, substantially as described.

6. In a device of the class described, a beam bent adjacent its rear end to provide a downwardly and forwardly projecting hook portion, the said bent portion of said beam being provided with a plurality of spaced apertures, a pivot adapted for insertion in said apertures, a jaw secured to said pivot and capable of swinging thereon toward and away from said hook portion, a lever pivoted to said beam, and a link connecting said jaw and said lever, substantially as described.

7. In a device of the class described, a beam having a hook portion, a jaw pivoted upon said beam and adapted to move toward and away from said hook portion, a lever on said beam, a clevis slidably arranged on said lever, means for locking said clevis, and a link connecting said clevis and jaw, substantially as described.

8. In a device of the class described, a beam having a jaw portion, a moving jaw on said beam, a lever pivoted upon said beam, the said lever being provided with spaced openings, a clevis slidably arranged on said lever, the said clevis being provided with apertures adapted to register with the openings in said lever, a pin for insertion in said apertures and openings, and a link connecting said clevis and said movable jaw, substantially as described.

9. In a device of the class described, a beam having a hook portion, a jaw pivoted upon said beam and capable of moving toward and away from said hook portion, a lever on said beam, a connection between said lever and said jaw whereby movements of the former will be transmitted to the latter, a pulley at the free end of said lever, and a draft apparatus comprising a cable secured at one end to said beam and passing over said pulley, substantially as described.

10. In a device of the character described, a beam bifurcated for the major portion of its extent, the said furcations being bent downwardly and forwardly to provide spaced hook portions, teeth on said portions, a shoe connecting said portions, a removable blade for said shoe, a jaw movably mounted upon said beam and capable of moving toward and away from said hook portion, and means for moving said jaw, substantially as described.

11. In a device of the class described, a beam bifurcated for the major portion of its extent, the furcations being bent downwardly and forwardly to provide spaced hook portions, a runner connecting said furcations, teeth on said furcations and runner, the bent portion of said furcations being provided with spaced registering openings, a jaw adapted to be pivoted in any of said openings and to move toward and away from said hook portions, and a lever adapted to be pivoted in any of said openings for moving said jaw, substantially as described.

12. In a device of the class described, a beam bent to form a downwardly and forwardly projecting hook, a movable jaw pivoted to said bent portion, a lever pivoted at said bent portion, and a link connecting said jaw and said lever, whereby the said jaw will be caused to move into and away from said hook portion upon rocking movement of said lever, substantially as described.

13. In a device of the class described, a plowing element comprising a hook portion and a beam portion, a runner secured to said beam portion and projecting laterally therefrom, a jaw pivoted on said beam and adapted to move toward and away from said hook portion, and a lever for moving said jaw, substantially as described.

14. In a device of the class described, an extractor comprising hook and beam portions, gripping means on said hook portion, the forward end of said beam being provided with a bearing portion, and means for the attachment of a draft apparatus to said extractor adjacent said hook portion and in arrears of and below said bearing portion, substantially as described.

15. In a device of the class described, an extractor comprising hook and beam portions, the forward end of said beam providing a bearing, a roller adjacent the rear end of said beam, and means for attaching a draft apparatus to said extractor adjacent the rear end of said hook portion, substantially as described.

In testimony whereof I affix my signature in presence of two witnesses.

OLUF E. OLESBERG.

Witnesses:
DAVID A. FRASER,
JOSEPH SMOLIK.

Copies of this patent may be obtained for five cents each, by addressing the "Commissioner of Patents, Washington, D. C."